July 15, 1958
R. STEVENSON
2,843,403
ROTARY SEAL
Filed Jan. 11, 1955
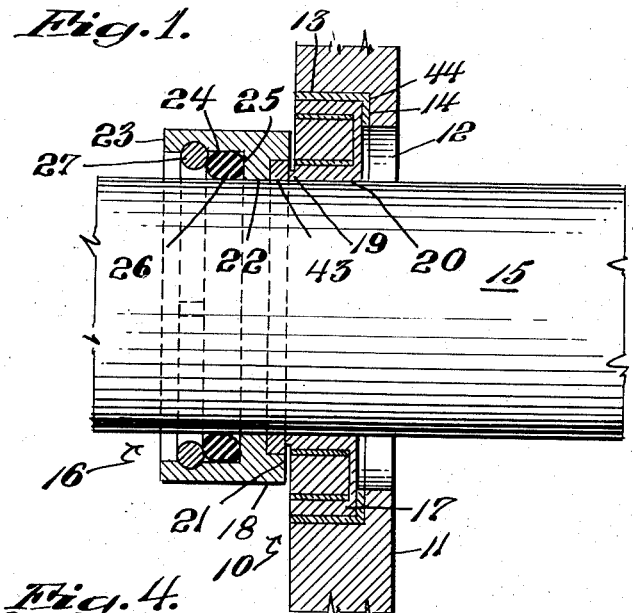
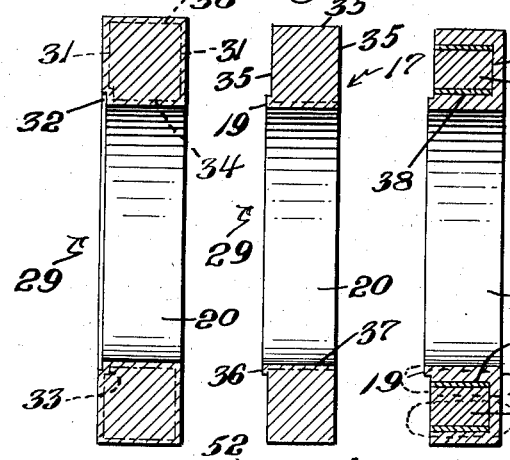
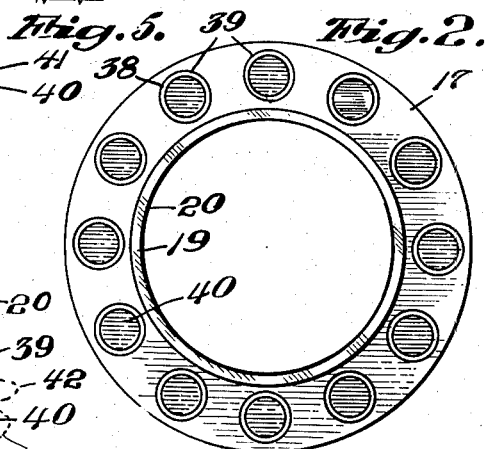
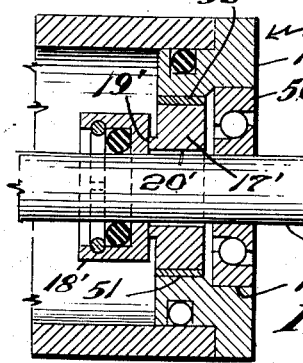
INVENTOR.
Robert Stevenson
BY
Barlow & Barlow
ATTORNEYS.

United States Patent Office 2,843,403
Patented July 15, 1958

2,843,403
ROTARY SEAL

Robert Stevenson, Wickford, R. I., assignor to Magnetic Seal Corp., a corporation of Rhode Island Application January 11, 1955, Serial No. 481,179

4 Claims. (Cl. 286—11.15)

This invention relates to a seal to prevent the escape of a fluid from between relatively rotatable parts and is a continution in part of my pending application for Seal, Serial No. 453,099, filed August 30, 1954, now abandoned.

Seals of this general character usually have a fixed annular abutment on the shaft which provides a sealing surface against which a sealing sleeve is spring biased to be thrust axially into frictional engagement with the said sealing surface. Such spring bias frequently throws off the proper alignment of the sealing faces.

An object of the invention is to improve generally on seals of the above character wherein a bias force will be equally distributed along the surfaces engaged.

Another object is to provide a seal of the above character which will be economical to manufacture and will be durable in use.

Another object of the invention is to eliminate the spring bias usually provided to hold the sealing surfaces in engagement when no fluid pressure exists.

A more specific object of the invention is to provide a seal construction in which the sealing surfaces will be biased into normal engagement by means of magnetic force.

Another object of the invention is to acquire a cooperation of the fluid pressure and the magnetic force both acting in the same direction to urge the sealing surfaces together.

Another object is to provide a seal construction in which one of the sealing units will be coupled with the shaft by means of an O-ring seal.

Another object is to provide a seal construction in which a sealing ring will be concentrically coupled to the shaft both for rotation therewith and movable axially into frictional engagement with the other sealing surface.

Another object of the invention is to provide a seal having only three parts.

Another object of the invention is to provide a seal in which the body thereof will consist of a low carbon steel and the sealing surfaces thereof hardened.

With these and other objects in view, the invention consists of certain novel features of construction as will be more fully described and particularly pointed out in the appended claims.

In the accompany drawing:

Figure 1 is a longitudinal sectional view through a fragmentary portion of a housing illustrating a fluid seal embodying my invention;

Figure 2 is a face view of one of the sealing members shown in Figure 1;

Figures 3 to 5 are similar sectional views showing different steps in making the sealing member shown in Figure 2;

Figure 6 is a sectional view similar to Figure 1 showing a modified seal construction.

Referring to Figures 1 to 5 which illustrate one embodiment of the invention, 10 designates generally a housing and the like with a wall 11 provided with a circular opening or bore 12 therethrough having an enlarged bore portion 13 and an inner annular shoulder 14. A rotatably mounted shaft 15 projects through the bore 13 and extends concentric therewith. A bearing (not shown) may be attached to the wall for mounting the adjacent portion of the shaft. It will be understood that the housing 10 contains a fluid (not shown) and that the shaft 15 is surrounded by this fluid at the left of wall 11. The fluid may be a working fluid under pressure. The seal designated generally 16 for preventing the escape of fluid from between the shaft and wall 11 comprises two annular members or rings 17 and 18 which surround shaft 15.

The ring 17 is positioned and held stationary in the bore portion 13 and has an annular lip 19 providing a sealing surface surrounding the shaft 15. The bore 20 of the ring is made sufficiently larger than the shaft so as to provide for a clearance therebetween.

The other ring 18 is mounted on the shaft to rotate therewith and has a sealing surface 21 which is adapted to engage in fluid-tight sealing engagement with the lip 19. The bore 22 of ring 18 is slightly larger than the shaft and permits axial movement of the ring 18 toward and from the other ring 17. The bore 22 is counterbored inwardly at the end 23 of the ring and forms an enlarged bore portion or annular recess 24 and shoulder 25. A soft O-ring seal 26 is positioned within the recess 24 and engages in fluid-tight contact against the shaft 15, the wall of bore 24, and the shoulder 25. Thus, the O-ring 26 prevents the escape of fluid between the shaft and wall of bore 22 and also provides a coupling means for securing the ring 18 to the shaft 15 for rotation therewith as well as permitting axial movement toward the sealing surface and a rocking movement of the ring for alignment of the sealing surfaces. A split ring 27 holds the O-ring against displacement in bore 24 after the assembling of the ring on to the shaft 15.

The ring 18 is exposed to the pressure of the fluid. The surface area at the end 23 exposed to the fluid pressure acting thereon in a direction tending to move the ring 18 toward ring 17 is an area equal to the area of the diameter of the ring minus an area equal to the diameter of shaft 15. The surface area at the end 21 of the ring 18 opposed to end 25 is a lesser area equal to the diameter of the ring 18 minus an area equal to the diameter of the sealing lip 19. Thus, there is provided opposite unequal pressure applying areas exposed to the fluid pressure such as to provide for a force to act on the ring 18 in a direction tending to urge the sealing surfaces of the rings into sealing engagement with each other. A choice in pressure differential across the ring 18 may be had by increasing or decreasing the outer diameter of lip 19. The O-ring seal 26 is also exposed to fluid pressure which acts thereon in a direction tending to compress the same and thus increase its frictional contact with the shaft 15 and ring 18. This pressure on the seal is equally distributed circumferentially on the parts engaged, thus maintaining the ring and shaft concentric to each other. The normal degree of frictional contact between the O-ring 26, the ring 18, and the shaft 15 at relatively little or no fluid pressure is such as to require a relatively light force to axially move the ring 18. As fluid pressure increases, this is reflected in greater frictional contact between sealing surfaces, which tends to oppose rotation of ring 18 with shaft 15. This increased pressure also acts on the O-ring 26 tending to compress the O-ring into trighter engagement and thus increases the driving grip of the O-ring to offset the opposing force of frictional contact between sealing surfaces and also maintains concentricity of the ring 18 with the shaft.

The ring 17 in accordance with the invention is made of a low carbon steel, as by way of example a 10-10 steel, which may be a cold rolled steel. Only the lip 19 and wall of bore 20 are hardened. This requires a prior carbonization of the surfaces to be hardened. To this end the ring or blank 29 (see Figure 3) is machined to a diameter to include the depth at which the surface of the blank will be carbonized as indicated in broken lines 30. As by way of example, should the depth of carbonization be 1/32 of an inch, then the diameter of the blank would be made 1/32 of an inch longer than the finished size required. The thickness or width of the blank is likewise made oversize to include the depth of carbonization as indicated in broken lines 31. The bore 20 is made just sufficiently under size to permit smoothing such as by a light grinding or a lapping operation to bring the bore to required dimension after the hardening process. The bore 20 is counterbored as at 32 to the diameter of the finished lip 19 and to a depth 33 equal to the depth of the adjacent surface carbonization. Thus, if the lip is to project a distance substantially equal to the depth at which the adjacent surfaces are to be carbonized, then the depth of the counterbore will be made to a depth equal to the said carbonization. The blank 29 machined as above described is subjected to a carbonized process in the known manner. After such carbonization of the blank, all exposed surfaces thereon have a deposit of carbon thereon to the required depth. The blank is further machined (see Figure 4) to proper size. This further machine operation will remove all the carbon material at surfaces 35. The removal of the material at surface 35 adjacent to the outer periphery of the counterbore 32 will form the lip 19 having a carbonized surface 36. The bore 20 will also have a carbonized surface 37 to a depth 34. The blank may now be subjected to a hardening process in the known manner, which will result in a case hardening of only the carbonized surfaces 36 and 37. The remaining surfaces of the blank are substantially unaffected by the hardening process and remain in the relatively soft state. The blank is next further machined so as to provide a plurality of equally spaced recesses 38 in each of which is frictionally received a sleeve 39 made of a non-magnetic conducting material, as by way of example, lead or brass. The recesses 38 may be made in the blank prior to the hardening process should this be more convenient in manufacture. A cylinder, plug, or button 40 of magnetizable material such as "Alnico" is seated in each recess 38 against the bottom wall 41 of the recess and the wall of sleeve 39. "Alnico" according to the General Electric Company Catalogue Carboloy Division, which carries a reprint of the permanent magnet design manual published in 1949, has the following percentages by weight: aluminum 6-12%; nickel 14-25%; cobalt 12½-35%; copper 0-6%; and balance iron. The plug is secured in place by being pressed to a force fit within sleeve 39. The lip 19 is next subjected to a lapping operation so as to provide an accurate sealing surface. Likewise, the bore 20 may be brought to a finished diameter. From the above it will be apparent that the ring 17 has a sealing lip which has a lapped hardened surface so as to provide for a longer period of usefulness and that the remaining portion of the ring 17 is in the unhardened state and of a nature to be better responsive to magnetic conductivity.

The plugs 40 are permanently magnetized subsequent to the insertion of the plugs in place in the recess 38. This magnetization is established in the "Alnico" plugs 40 with the line of magnetic flux directed lengthwise of the plugs 40, that is, parallel to the axis of bore of the ring 17 with the north pole at the exposed end face of the plugs and the south pole at the inner face of the plugs. The flux circuit is completed around the non-magnetic conducting sleeve 39 as indicated generally in broken lines 42.

The ring 18 is also made of a low carbon non-hardened steel and is counterbored at the sealing surface 21 to form an annular recess in which a carbon ring 43 is secured in position as by being pressed to a force fit within the recess. The ring 43 is made flush with the adjacent surface of the ring 18 and is of a diameter to engage with the lip 19 in sealing engagement therewith. Thus, there is provided a hardened sealing ring surface on each ring carried by relatively soft steel bodies. The hardened surfaces are highly resistant to wear and the softer bodies provide for better conductivity of magnetic force than were the rings made of hardened steel.

The magnetic attraction between the rings 17 and 18 serves to maintain contact between them when the pressure of the fluid within the housing drops to a degree less than the opposing force of the normal frictional engagement had by the O-ring 26 with the shaft and walls of recess 24. The magnetic force of ring 18 is chosen or made such as to be slightly greater than the resistance offered to axial movement by the said normal frictional engagement of the O-ring 26 and thereby offer a minimum resistance to rotation of ring 18 with shaft 15. Thus, I provide a magnetic bias acting on the sealing rings in a direction tending to hold the sealing surfaces engaged at such times as the shaft is idle or when there is a pressure drop in fluid to a degree insufficient to maintain the sealing surface in sealing engagement with each other. It will also be observed that by reason of making the sealing rings of a relatively soft steel as above described, the effectiveness of the magnet is greatly enhanced. It may be further observed in Figure 1 that the lip 19 spaces the rings from each other so as to concentrate the effective forces of the magnets at the lip 19. Thus, the distance of the spacing may be chosen to additionally control the magnetic bias between rings 17 and 18.

The housing 10 may be made of any suitable material and when made of a non-magnetic conducting material, as for example aluminum material, the ring 17 may be inserted and held in contact with the walls of bore portion 13. Should the housing, however, be made of a magnetic conducting material, a sleeve or the like 44 made of a non-magnetic conducting material is positioned between the walls of bore portion 13 and shoulder 14 so as to magnetically insulate the ring 17 from the housing 10 so as to combine effective lines of magnetic flux in the areas as above described. The "Alnico" plugs 40 have been described as being magnetically insulated at the periphery thereof by a non-magnetic conducting sleeve 39. There may be substituted for the sleeve 39 a coating or the like of a non-magnetic material placed on the plugs 40 to effect a non-magnetic insulation or shield between the plugs 40 and the ring body. It will be apparent that I confine the magnetic forces in such a manner as to prevent the dissipation thereof in the adjacent structures and thus preserve the life of the magnet.

In Figure 6 there is shown a modified construction which is adapted to seals of smaller size. In the modification 10' designates generally a housing having an end wall 11' through which a rotatable shaft 15' projects. The shaft is journalled in an anti-friction bearing 50, the outer race of which is held stationary in a usual manner in the bore 12' of the end wall 11' and the inner race of which is held stationary on the shaft in the known manner. The inner portion of bore 12' is reduced as at 51. A sealing ring 17' having a sealing lip 19' is positioned in the bore portion 51 and held stationary to the walls thereof. The bore 20' of the ring 17' is made larger than the shaft 15' to provide a clearance therebetween, as shown. The ring 17' is made of a magnetizable material such as "Alnico" and permanently magnetized. This magnetization is established in the ring 17' with the line of magnetic flux directed axially of the ring, that is, parallel to the axis of the bore 20' of the ring, with the north pole at the sealing surface end of the ring and the south pole at the other end of the ring. The flux circuit is completed within the confines of a non-magnetic conducting sleeve 52 positioned between the ring 17' and the bore 51. The ring 18' is similar to the ring 18 with the exception that the carbon ring insert 43 is omitted.

I claim:

1. A rotary seal to prevent the escape of fluid under pressure from between relatively rotatable parts comprising a housing, a shaft extending through said housing, a first member surrounding said shaft and mounted in said housing and held against rotation relative thereto, said member having an annular sealing surface in a single plane, a second member having an annular sealing surface in a single plane adapted to engage in fluid sealing engagement with the first said annular sealing surface, said second member being mounted on said shaft for rotation therewith, a soft O-ring between one of said parts and the member secured thereto for so mounting the member that it is anchored to its part and yet may have relative axial movement and rocking movement relative to said part for engagement and alignment of said faces, the other member being secured to its part by means which are uniform circularly about the axis of the shaft and springless means consisting of a magnetized material carried by one of said members and material attracted thereby carried by the other member to draw said sealing faces together.

2. A rotary seal as set forth in claim 1 wherein said magnetized material comprises a plurality of equally spaced separate magnets, and each of said magnets is surrounded by a non-magnetic conducting means.

3. A rotary seal as set forth in claim 1 wherein said first member is held in said housing and carries said magnetized material.

4. A rotary seal as set forth in claim 3 wherein said second member is provided with an insert of carbon presenting the other annular sealing face and running against the member having the magnetized material.

References Cited in the file of this patent

UNITED STATES PATENTS

| | | |
|---|---|---|
| 2,297,477 | Huhn et al. | Sept. 29, 1942 |
| 2,365,046 | Bottomly | Dec. 12, 1944 |
| 2,405,464 | Storer | Aug. 6, 1946 |
| 2,556,225 | Serge | June 12, 1951 |

FOREIGN PATENTS

| | | |
|---|---|---|
| 678,981 | Great Britain | Sept. 10, 1952 |